Patented Feb. 28, 1933

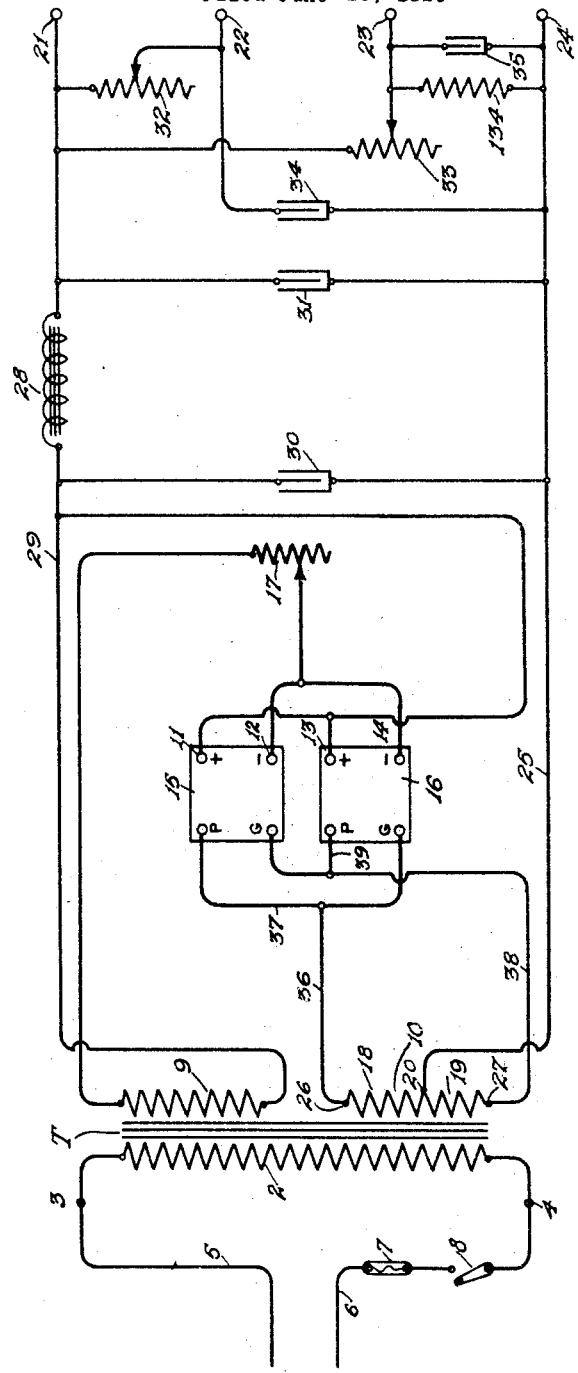

1,899,045

UNITED STATES PATENT OFFICE

CARL MILLER, OF CHICAGO, ILLINOIS, ASSIGNOR TO KELLOGG SWITCHBOARD & SUPPLY CO., OF CHICAGO, ILLINOIS, A CORPORATION OF ILLINOIS

RECTIFIER

Application filed June 18, 1926. Serial No. 116,785.

My invention relates to means for obtaining unidirectional or direct current of constant value from various sources more particularly from a source of alternating current.
Various means have heretofore been employed for rectifying alternating currents and inductances and condensers have been utilized for reducing or quieting the variations in the rectified current, and an object of my invention is to provide means for reducing the variations in the rectified current to such a degree that it will not be noticeable in any arrangement in which the current may be utilized.

My invention has to do particularly with the use of the rectified current for radio receiving sets employing audion tubes and an object of my invention is to so arrange the rectifying circuits and potential controls for the plates of the tubes of the radio receiving set which operates in conjunction with the rectifier of my invention that a quiet operation of the radio circuit, free from variation of the rectified current will be produced.

A feature of my invention is the novel way of connecting the tube sockets which receive the rectifying valves or tubes so that a half wave rectifier of the usual two element type may be used in each tube socket so that each tube will rectify one half of the cycle of alternating current or by the use of a double wave rectifier valve in one of the tube sockets in place of the two half wave rectifiers this double wave rectifier valve will rectify both halves of the cycle of alternating current.

The above features as well as others not specifically pointed out will be more fully pointed out in the following description and appended claims, and, for a more complete understanding of my invention reference may be had to the accompanying drawing in connection with the accompanying description.

The transformer T is provided with a primary winding 2 whose terminals 3 and 4 are connected to conductors 5 and 6 which lead to a suitable source of alternating current. The conductor 6 leading to the source of alternating current is provided with a suitable protective device or fuse 7 and a switch 8 for disconnecting the alternating current from the rectifying device of my invention. The transformer T is provided with windings 9 and 10, the said winding 9 is connected across the plus and minus filament terminals 11, 12, and 13, 14 of the respective tube sockets 15 and 16 and provides current for heating the filaments of the rectifier tubes which are inserted therein. A suitable rheostat 17 connecting the filament leads from terminals 12 and 14 of the respective tube sockets 15 and 16 is for the usual purpose of regulating the supply of current to the filaments.

The coil 10 of the transformer T has a pair of windings 18 and 19, the central point 20 of these windings are connected together and extends over a conductor 25 to a terminal post 24, which forms one terminal or pole of the rectified and uni-directional current. The terminal 26 of the winding 18 is connected to the plate posts marked P and G of the respective tube sockets 15 and 16 and the terminal 27 of the winding 19 is connected to the plate posts marked P and G of the respective tube sockets 16 and 15 for purposes as will be more fully hereinafter described. The filament terminals 11 and 13 of the respective tube sockets 15 and 16 are connected together and extend through a choke coil 28 over conductor 29 to the terminal post 21. From one side of the inductance coil 28 and bridged across the conductors 25 and 29 is a condenser 30 and from the other side of the choke coil 28 and bridged across the conductors 25 and 29 is a condenser 31 and the choke 28 and condensers 30 and 31 operate in the well known manner to reduce the variations in the rectified or uni-directional current across the terminal posts 21 and 24.

I provide different potential terminal posts 22 and 23 and I connect a variable resistance unit 32 to the terminal post 22 which extends to the terminal post 21, to give the required potential drop across the rectified current leads. I also connect a variable resistance unit 33 which extends to the terminal post 21, to give a further drop in potential across the rectified current leads and these variable resistance units 32 and 33 are so arranged with relation to the terminal posts 22 and 23 so that the potential across the terminals 22 and 24 and 23 and 24 may be varied within a predetermined degree. I have found that this feature is very desirable and is necessary to obtain a complete dampening of the variations in the uni-directional current. A resistance leak 134 bridged between the terminal posts 23 and 24 is for the usual purpose of providing an additional load across the terminals to which a detector tube is connected to further reduce the voltage and condensers 34 and 35 bridged across the respective terminal posts 22, 24 and 23, 24 are for additional filtering purposes.

The terminal 26 of the winding 10 of the transformer T is connected by conductors 36 and 37 to the plate terminal P of the tube socket 15 and the terminal G of the tube socket 16. The terminal 27 of the winding 10 of the transformer T is connected by conductors 38 and 39 to the terminal G of the tube socket 15 and the plate terminal P of the tube socket 16. A half wave rectifier of the usual two element type which comprises a filament and plate is used for rectifying purposes and a tube of this type is inserted in each of the tube sockets 15 and 16. The connections from the terminals 26 and 27 of the winding 10 of the transformer T are connected to the respective tube sockets 15 and 16 so that each rectifier tube rectifies one half of the cycle of alternating current, which the winding 10 receives inductively from the primary winding 2 of the transformer T. A single rectifier tube of the double wave type comprising a filament and two plates may be used for rectifying purposes in place of the two half wave rectifiers. A tube of this type may be inserted in either tube socket 15 or 16 and the terminals 26 and 27 of the winding 10 will be connected to the two plates of the rectifier tube to rectify both halves of the wave. The double rectifier tube has its one plate connected to a prong that contacts with spring G of the socket and its other plate connected to a prong that contacts with the spring P of the socket.

By using two valves or tubes for rectifying purposes or a single tube of the type above described which rectifies both halves of the wave in conjunction with the inductance 28 and condensers 30, 31, 34 and 35 and variable resistance units 32 and 33, I am able to provide uni-directional current across the terminals 21, 22, 23 and 24 with an undetectable variation in the rectified current.

While I have only described the apparatus which I used in my circuit arrangement, I do not believe that it is necessary to go into details as to how the tubes rectify the current which is inductively produced in coil 10 and how the condensers in conjunction with the inductance reduce the variations in the rectified current as this is well understood by those skilled in the art. With the description of the apparatus given, it is obvious that any one skilled in the art may readily understand my invention.

While I have illustrated a preferred embodiment of my invention, it is to be understood that I do not wish to be limited thereto, as changes and modifications will readily suggest themselves without departing from the spirit and scope of the appended claims.

What I claim as new and desire to secure by Letters Patent of the United States is:—

1. A device of the character described for furnishing uni-directional current including a transformer having a winding connected to a source of alternating current, a second winding for said transformer, a pair of sockets, filament terminals and auxiliary terminals for said sockets, one end of said second winding connected to an auxiliary terminal on each of said sockets, the other end of said second winding connected to another auxiliary terminal of each of said sockets, a third winding for said transformer having its respective ends connected to a filament terminal on each of said sockets, an output circuit having one side connected to the midpoint of said second winding and its other side connected to a filament terminal on each of said sockets, said device adapted to receive a full wave rectifier in either of said sockets or a pair of half-wave rectifiers in said pair of sockets.

2. A device for rectifying alternating current including an inductorium connected to a source of alternating current, a pair of rectifier receptacles having contact terminals, terminals of each of said receptacles being connected in multiple to terminals of the other of said receptacles and to a winding of said inductorium and two other terminals of said receptacles being connected to another winding of said inductorium, an output circuit for said device having one side connected to the midpoint of said winding and its other side connected to a terminal of each of said receptacles, said device adapted to receive either a full wave rectifier in either of said receptacles or a pair of half-wave rectifiers in each of said receptacles to provide uni-directional current from the full wave of said source of alternating current.

Signed by me at Chicago, in the county of Cook and State of Illinois, this 15th day of June, 1926.

CARL MILLER.